350-276
3/16/82 XR 4,320,442

SR

United States Patent [19]

McCamy

[11] 4,320,442
[45] Mar. 16, 1982

[54] ANNULAR ILLUMINATOR

[75] Inventor: Calvin S. McCamy, Wappingers Falls, N.Y.

[73] Assignee: Kollmorgen Technologies Corporation, Dallas, Tex.

[21] Appl. No.: 83,618

[22] Filed: Oct. 11, 1979

[51] Int. Cl.[3] .......... F21V 7/05; F21V 7/08; G02B 5/136; G01N 21/48

[52] U.S. Cl. .......... 362/301; 350/292; 350/293; 350/294; 350/299; 350/276 R; 350/277; 356/445; 356/446; 362/297; 362/302; 362/303; 362/346; 362/347; 362/349

[58] Field of Search .......... 362/297, 298, 301, 302, 362/303, 304, 305, 343, 346, 347, 348, 349; 350/292, 293, 294, 299, 276 R, 277; 356/445, 446

[56] References Cited

U.S. PATENT DOCUMENTS

| | | | |
|---|---|---|---|
| 1,153,446 | 9/1915 | Roffy | 362/302 |
| 1,279,096 | 9/1918 | Fitzgerald | 362/298 |
| 1,434,383 | 11/1922 | Harris | 362/298 |
| 1,998,967 | 4/1935 | Raynolds | 362/298 |
| 2,143,673 | 1/1939 | Baumgartner | 362/343 |
| 2,341,658 | 2/1944 | Salani | 362/348 |
| 3,449,561 | 6/1969 | Basil et al. | |
| 3,707,626 | 12/1972 | Delchen | 362/343 |
| 4,022,534 | 5/1977 | Kishner | 356/210 |
| 4,087,682 | 5/1978 | Kolodziej | 362/297 |

FOREIGN PATENT DOCUMENTS

| | | | |
|---|---|---|---|
| 189285 | 3/1957 | Austria | 362/304 |
| 922941 | 1/1955 | Fed. Rep. of Germany | 362/349 |
| 1179022 | 10/1964 | Fed. Rep. of Germany | 362/301 |
| 489781 | 3/1919 | France | 362/295 |
| 26512 | 1/1924 | France | 362/301 |
| 762484 | 4/1934 | France | 362/298 |
| 464126 | 12/1968 | Switzerland | 362/297 |

*Primary Examiner*—Teddy S. Gron

[57] ABSTRACT

An annular illuminator comprising a spheric mirror, an elliptic mirror and a circular cylindric mirror. Flux received directly from the source is reflected by the elliptic mirror and then by the cylindric mirror. Flux not directed initially toward the elliptic mirror is first reflected by the spheric mirror and then by the elliptic and cylindric mirrors.

8 Claims, 1 Drawing Figure

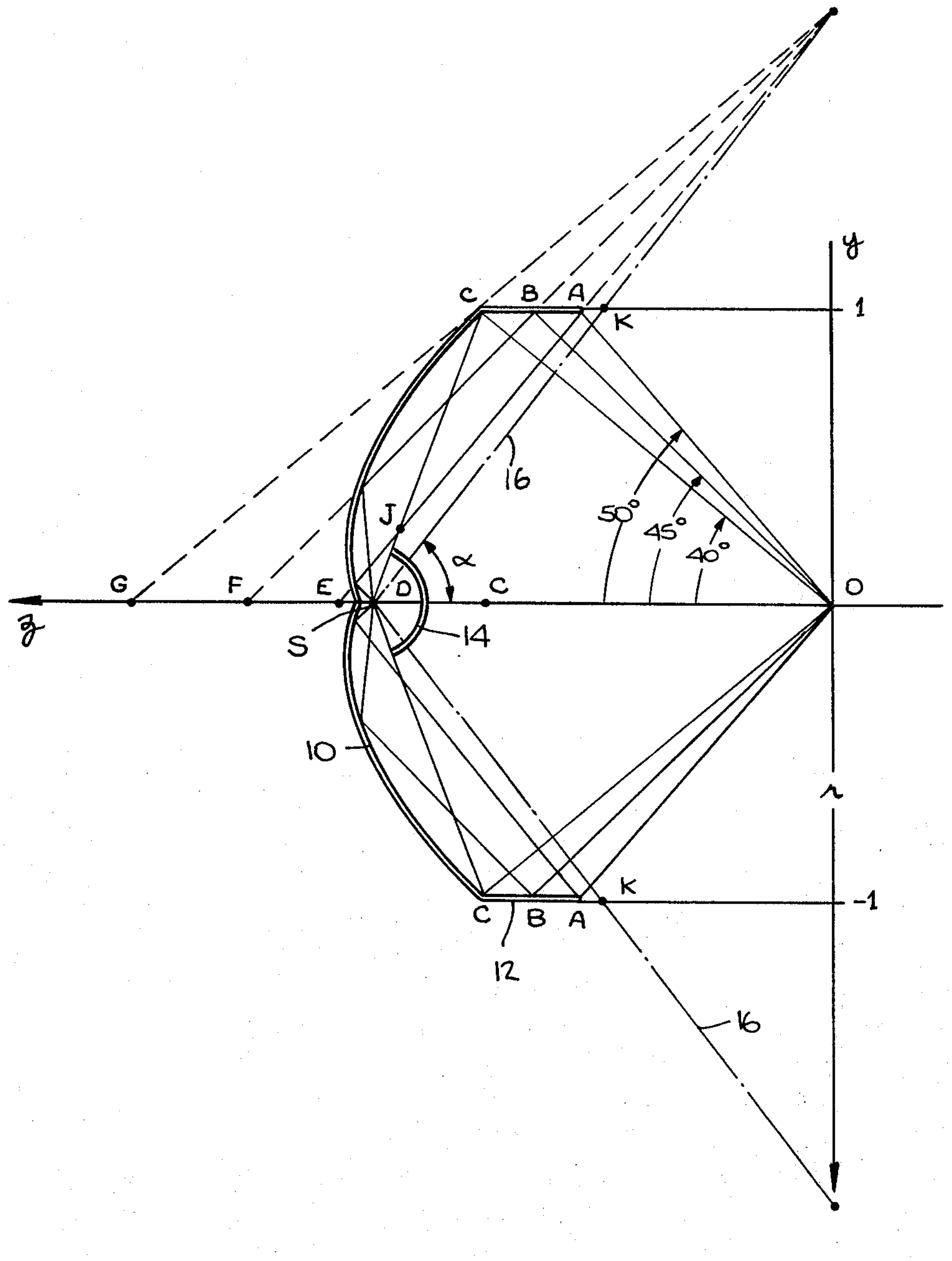
y
C
B
A
K
1
16
J
50°
45°
40°
α
G
F
E
D
C
O
z
S
14
10
r
K
-1
C
B
A
12
16

ANNULAR ILLUMINATOR

BACKGROUND AND BRIEF DESCRIPTION OF THE INVENTION

The present invention relates to annular illuminators and, more particularly, to a 45° annular illuminator.

When examining a surface critically to judge its color or to discern an image or pattern, it is preferable to orient the illuminant so the surface is well illuminated but no light is specularly reflected to the eye. If a plane surface is viewed normally and illuminated at 45° to the normal, these conditions can be met. Indeed, several standardizing bodies have chosen 45° illumination for the measurement of certain reflecting characteristics of surfaces. See, e.g., Colorimetry, Official Recommendations of the International Commission on Illumination, Publication CIE No. 15 (E-1.3.1) 1971, Paragraph 1.4; 45-Deg. 0-Deg Directional Reflectance of Opaque Specimens by Filter Photometry, Test for ASTM E97; American National Standard Diffuse Reflection Density, ANS PH2.17-1958.

Various types of illuminating systems are known in the prior art. U.S. Pat. No. 4,022,534 to Kishner has a 45°/0° illuminator/collector geometry and employs a wedge-shaped diffuser and a cylindrical reflector to obtain 45° illumination. U.S. Pat. No. 1,445,306 to Epstein shows a reflector having a light source interposed between a semi-ellipsoidal reflecting surface and a spherical surface. U.S. Pat. No. 3,982,824 to Rambauske discloses a catoptric lens arrangement utilizing a primary mirror formed by rotating a portion of a parabola within a secondary mirror formed by a portion of an ellipse. U.S. Pat. No. 1,711,478 to Halvorsen, Jr. discloses a reflector having a parabolic region and two spherical regions of different radii. U.S. Pat. No. 3,257,574 to McLintic shows a reflector comprising a concave ellipsoidal section and a truncated concave spherical section. U.S. Pat. No. 3,893,754 to McInally discloses a mirror system utilizing paraboloid and ellipsoid mirrors in combination. U.S. Pat. No. 3,801,773 to Matsumi shows a reflector comprising two pairs of congruent, coaxial prolate spherical surface portions, each of which is disposed outwardly of the other. U.S. Pat. No. 3,449,561 to Basil et al. shows a mirror formed by revolving about a generating axis curved line segments which constitute in part portions of ellipses whose major axes lie at different acute angles to the generating axis. Finally, U.S. Pat. No. 4,002,499 to Winston discloses an energy collector comprising a pair of involute sections forming what is sometimes called a "gull-wing" solar collector.

In accordance with the present invention there is provided a highly efficient annular reflector comprising in combination a spheric mirror, an elliptic mirror and a circular cylindric mirror. Flux received directly from the source is reflected by an elliptic surface of revolution and then by the cylindric mirror. Flux not directed initially toward the elliptic mirror is first reflected by the spheric mirror and then by the elliptic and cylindric mirrors. This system is highly efficient since it utilizes all of the flux except that directed in a small angle about the axis of revolution. The annular illuminator of the present invention is useful for illuminating at angles of about 45° as well as at angles of other than about 45° such as angles between about 40° and about 50°.

BRIEF DESCRIPTION OF THE DRAWING

The instant invention may be better understood with the aid of the drawing forming a part of the specification and in which is shown in section a preferred embodiment of the annular illuminator of the present invention.

DETAILED DESCRIPTION

Referring to the Figure, there is shown a sectional view of a preferred embodiment of the annular illuminator of the present invention. The annular illuminator comprises an elliptic surface 10, a cylindric surface 12 and a spheric surface 14. All three surfaces are symmetrical with respect to the optical axis Oz and all three surfaces are surfaces of revolution about the optic axis.

A source S is located at point D which is at one focus of the ellipse on the optic axis. The major axis 16 of the ellipse is at an acute angle $\alpha$ with respect to the optic axis. Rays from source S which are reflected by elliptic mirror 10 would come to a focus on a circle of radius r far off the optic axis but are intercepted and reflected by cylinder 12. Spheric surface 14 reflects rays, that would otherwise be lost, back into the illuminator system.

As shown in the Figure, the sample is located at 0, i.e., x=y=z=o. The radius of the circular cylindric surface is 1 unit, i.e., y=1. For the cross-section shown, x=o. Therefore:

1/A=tan 50°=1.1918
1/B=tan 45°=1.0000
1/C=tan 40°=0.8391
E=2A
F=2B
G=2C
A=0.8391
B=1.0000
C=1.1918
E=1.6782
F=2.0000
G=2.3835

Source S must lie on the optic axis Oz. The source distance D must exceed C to avoid having the sphere reflect itself. The sphere must extend to but not beyond line CD so that the cylinder is not directly illuminated by divergent flux. The sphere may extend to but not beyond the line AE so that the cylinder is fully illuminated by light reflected from the ellipse. Thus, source S must lie between C and E, i.e., between 1.1918 and 1.6782. It has been found that a good choice for D is about 1.5 units. Under these circumstances the source is located at (0, 0, 1.5) and the center K of the ellipse is located at (0, 1, 0.75). The ellipse is generally described by the equation:

$$\frac{X^2}{a^2} + \frac{Y^2}{b^2} = 1;$$

where X and Y are coordinates of an auxiliary coordinate system, a is the semimajor axis and b is the semiminor axis. The distance from the center of the ellipse to a focus is c, where $a^2=b^2+c^2$. In the present case $$c=DK=\sqrt{1^2+(0.75)^2}=1.250 \text{ and } c^2=1.5625.$$

Since $\sin\alpha=1/c=0.8$, the angle $\alpha$ between the optic axis Oz and the major axis of the ellipse is 53.13°. This is the angle between the z-axis and the X-axis. Both foci lie on the X-axis. Only one focus of the ellipse lies on the z-axis, viz, at the source. The ellipse must pass through point C on the Figure. In the (y,z) system C lies at (1, 1.1918). CK has a length 1.1918−0.75=0.4418. In the (X,Y) system, C has coordinates $Y=0.4418 \sin \alpha=0.3534$
$X=0.4418 \cos \alpha=0.2651$ If we let $a^2=P$, $b^2=Q$, and $c^2=R$, the equation of the ellipse can be written in the convenient form:

$$QX^2+PY^2=PQ$$

where $$P=Q+R$$

If P is eliminated by combining the last two equations, and then the terms are rearranged, the following quadratic equation in Q is obtained where R is a constant and X and Y are known for one point:

$$Q^2+(R-X^2-Y^2)\,Q-RY^2=0.$$

The solution is:
$Q=0.1303=b^2$;
$b=0.3610$ and
$P=R+Q=1.6928=a^2$;
$a=1.30108$.

Therefore, the equation of the ellipse in (X, Y) space is $$\frac{X^2}{1.693}+\frac{Y^2}{0.1303}=1$$

and the constants of the ellipse are:
semimajor axis, a=1.301;
semiminor axis, b=0.3610;
semifocal length, c=1.2500.

The cylinder has a diameter of 1 unit and a length of AC=0.3527 units.

In the Figure, sphere 14 must have a radius less than the distance DJ, i.e., less than 0.36 units.

Thus, the ellipse utilizes flux emitted at angles to the optic axis from 72.9° to 126.2° (the angle to the origin is considered to be 0°). Since this range extends from 17.2° below the normal to 36.2° above normal, there is a range of 36.2−17.2=19° over which the flux at angles less than 72.8° would be lost were it not for sphere 14 reflecting these rays back into the system. The use of sphere 14 increases the range of utilization to the range from 53.8° to 126.2°, a total range of 72.4°. It should be noted that this design utilizes flux from an angular range five (5) times that found for the single ellipse or for two parabolas. The utilized range is exactly centered on the normal.

Although the present invention has been described with respect to a preferred embodiment, it will be understood that many variations and modifications will now be obvious to those skilled in the art. For example, the smooth surfaces of rotation could be approximated by faceted surfaces. As such they would be the optical equivalent of the surfaces disclosed. Similarly, while the reflecting surfaces are described in terms of surfaces of revolution it will be appreciated by those skilled in the art that in some applications surfaces generated by partial (i.e., less than 360°) rotation may be employed. Thus, when a surface is described herein as being generated by rotating a segment about an optic axis, this description embraces both surfaces formed by a full (360°) rotation and surfaces formed by a partial (less than 360°) rotation. Accordingly, the scope of the invention is limited, not by the specific disclosure herein, but only by the appended claims.

I claim:

1. A 45° annular illuminator for reflecting flux comprising:
an elliptic reflector having a surface defined by rotating a segment of an ellipse about an optic axis, said segment intersecting said optic axis, the major axis of the ellipse forming an acute angle with said optic axis, one focus of said ellipse being located on said optic axis;
a cylindric reflector having a surface defined by rotating a straight linear segment about said optic axis, said cylindric reflector being contiguous to said elliptic reflector and adapted both to receive flux reflected from the concave surface of said elliptic reflector and to reflect said flux to a point on said optic axis at angles of incidence of between about 40° and about 50°; and
a spheric reflector spaced from said elliptic reflector and said cylindric reflector, said spheric reflector having a surface defined by rotating a segment of a circle about said optic axis, the concave surface of said spheric reflector facing the concave surface of said elliptic reflector.

2. The illuminator according to claim 1 further including a source of flux located on said optic axis intermediate said elliptic reflector and spheric reflector.

3. The illuminator according to claim 2 wherein the radius of said cylindric reflector equals the radial distance of the center of said generating ellipse from said optic axis.

4. A 45° annular illuminator for reflecting flux comprising:
an elliptic reflector having a surface defined by rotating a segment of an ellipse about an optic axis, said segment intersecting said optic axis, the major axis of the ellipse forming an acute angle with said optic axis;
a cylindric reflector having a surface defined by rotating a straight linear segment about said optic axis, said cylindric reflector being contiguous to said elliptic reflector and adapted both to receive flux reflected from the concave surface of said elliptic reflector and to reflect said flux to a point on said optic axis at angles of incidence of between about 40° and about 50°;
a spheric reflector spaced from said elliptic reflector and said cylindric reflector, said spheric reflector having a surface defined by rotating a segment of a circle about said optic axis, the concave surface of said spheric reflector facing the concave surface of said elliptic reflector;
a source of flux located on said optic axis intermediate said elliptic reflector and said spheric reflector; and
an object located along said optic axis and having a surface illuminated by flux reflected from said cylindric reflector.

5. The illuminator according to claim 4 wherein the radius of said cylindric reflector equals the radial distance of the center of said generating ellipse from said optic axis.

6. The illuminator according to claim 4 wherein said illuminated surface is located at the origin of a rectangular coordinate system, said cylindrical reflector has a radius of unity and said source is located between 1.1918 and 1.6782 units from said origin along said optic axis.

7. The illuminator according to claim 6 wherein said source is located about 1.5 units from said origin along said optic axis.

8. The illuminator according to claim 6 wherein said spheric reflector has a radius of less than 0.36 units.

* * * * *